United States Patent
Mukaida (10) Patent No.: US 7,301,868 B2
(45) Date of Patent: Nov. 27, 2007

(54) OPTICAL DISK RECORDING/REPRODUCING METHOD AND RECORDING/REPRODUCING APPARATUS USING THE SAME

(75) Inventor: Masaru Mukaida, Tokyo (JP)

(73) Assignee: NEC Corporation, Tokyo (JP)

( * ) Notice: Subject to any disclaimer, the term of this patent is extended or adjusted under 35 U.S.C. 154(b) by 373 days.

(21) Appl. No.: 10/507,733

(22) PCT Filed: Mar. 20, 2003

(86) PCT No.: PCT/JP03/03465

§ 371 (c)(1),
(2), (4) Date: Sep. 15, 2004

(87) PCT Pub. No.: WO03/079337

PCT Pub. Date: Sep. 25, 2003

(65) Prior Publication Data

US 2005/0128909 A1      Jun. 16, 2005

(30) Foreign Application Priority Data

Mar. 20, 2002  (JP) ............................ 2002-077444

(51) Int. Cl.
*G11B 7/125* (2006.01)
(52) U.S. Cl. .................. 369/47.53; 369/53.26; 369/116
(58) Field of Classification Search ............... None
See application file for complete search history.

(56) References Cited

U.S. PATENT DOCUMENTS 4,648,085 A      3/1987   Shimonou (Continued)

FOREIGN PATENT DOCUMENTS

JP        5-144000        6/1993

(Continued)

OTHER PUBLICATIONS

Translation of Sunakawa et al (JP 05-144000).*

(Continued)

*Primary Examiner*—Andrea Wellington
*Assistant Examiner*—Michael V Battaglia
(74) *Attorney, Agent, or Firm*—Young & Thompson (57) ABSTRACT

There provided an optical disk recording/reproducing method and an apparatus thereof capable of constantly forming an optimum mark region while appropriately correcting recording conditions. A sample hold circuit 6 detects and holds the level of a TPP signal to output a state monitoring signal. A reference level setting portion 8 holds the level of the state monitoring signal at which an optimum recording state is obtained and outputs a reference level signal. A recording state determining portion 7 outputs a record shortage signal and a record surplus signal based on the result of comparison between the reference level signal and the state monitoring signal. An LD output correcting portion 9 outputs an LD output correcting signal based on the record shortage signal and the record surplus signal as well as a record data signal. An LD output setting portion 10 outputs an LD output reference signal corresponding to an LD output set value at which to obtain an optimum light intensity of the laser beam for recording. An LD output controlling portion 11 outputs an LD output controlling signal corresponding to the result of add calculation of the LD output reference signal and the LD output correcting signal to an LD driving portion 12.

24 Claims, 3 Drawing Sheets

U.S. PATENT DOCUMENTS 6,359,847 B1 * 3/2002 Shimizu .................. 369/53.26
6,842,413 B2 * 1/2005 Miyaki .................... 369/47.53
6,961,294 B2 * 11/2005 Matsui .................... 369/53.27
6,967,914 B2 * 11/2005 Udagawa et al. ........ 369/47.51

FOREIGN PATENT DOCUMENTS

| JP | 7-29179 | 1/1995 |
| JP | 07057268 A * | 3/1995 |
| JP | 10-283635 | 10/1998 |
| JP | 2001-184659 | 7/2001 |
| JP | 2001351242 A * | 12/2001 |

OTHER PUBLICATIONS

Translation of Suzuki et al (JP 07-057268).*

* cited by examiner

OPTICAL DISK RECORDING/REPRODUCING METHOD AND RECORDING/REPRODUCING APPARATUS USING THE SAME

TECHNICAL FIELD

The present invention relates to an optical disk recording/reproducing method and a recording/reproducing apparatus using the same, particularly relates to an information recording method and an information recording apparatus using the method which performs recording and reproducing information by making use of an optical disk using a medium characterized in that phases of reflected lights are different between a recorded region and an unrecorded region (hereinafter referred to as non-recoded region or a space region).

BACKGROUND ART

Conventionally, despite an optical disk is cheap, it has advantages of storing a large amount of data, and further being excellent in storage stability of a disk. Nowadays, compatibility between a ROM disk (Read Only Memory) and this optical disk apparatus is placed emphasis on, because CD-R (Compact Disc-Recordable) and DVD-R (Digital Versatile Disc-Recordable) using an organic dye based medium are often utilized for recording. When storing information in these organic dye based media, reflectance ratio (45% or more) same as the ROM disk is obtained in an unrecorded region, and the reflectance ratio lowers in a recorded region (hereinafter referred to as a mark region) to obtain a sufficient degree of modulation (0.6 or more).

Recording of information onto an optical disk using such an organic dye based medium forms the mark region, for instance, based on a record data signal corresponding to recorded information. Specifically, in a period when the record data signal is high level, the organic dye based medium is irradiated with a laser beam of an intensity at which the mark region can be formed, thereby to form the mark region in a recording layer. While, in a period when the record data signal is low level, the organic dye based medium is irradiated with a laser beam of an intensity at which the mark region cannot be formed (normally, an intensity being lower than that of the laser beam irradiated when reproducing the recorded information, thereby to form a space region in the recording layer.

When the intensity of irradiated laser beam is insufficient or excessive, width of the mark region increases or decreases and lengths of the mark region and the space region vary to form the mark region and the space region which are not correspond to the record data signal, thereby precise reproduction of the recorded information becomes impossible.

Therefore, before recording information on such an optical disk, the intensity of the laser beam is adjusted, and a test information is recorded on an inner-most peripheral portion of the optical disk, followed by reproducing the recorded test information to measure asymmetry (hereinafter referred to as β value). An optimum intensity of the laser beam is calculated, which allows a desired β value to be obtained, and the intensity of the laser beam is set to the optimum intensity to perform recording the information.

However, as this optimum intensity is calculated in a test recording area of the inner-most peripheral portion of the optical disk (hereinafter referred to as PCA), sensitivity in the recording layer is varied in the area excluding this area or distribution in intensity of the laser beam collected on an surface of the optical disk is also varied due to defocus, offtrack, tilt error and so on, resulting in the same condition as the case that light intensity falls. Namely, there are problems that the formed mark region and space region do not correspond to the record data signal and that jitter deteriorates, and thereby the recorded information cannot be precisely reproduced.

Then, for instance, written standards of CD-ROM and DVD-R and Japanese Laid-Open Patent Publication No.H5-144000 disclose a technique of detecting a sum of reflected light of a laser beam for recording which is irradiated on a surface of an optical disk, and correcting intensity of the laser beam (normally, it is called as ROPC) so as to equalize the level of the sum of the reflected light in the vicinity of termination of irradiation of the laser beam for recording to a predetermined level, which is a publicly known technique.

Namely, when the intensity level of the sum of the reflected light is high, formation of the mark region is insufficient, which indicates that the intensity of the laser beam for recording is too low. While, when the intensity level of the sum of the reflected light is low, formation of the mark region is excess, which indicates the intensity of the laser beam for recording is too high. The intensity of the laser beam is corrected so as to conform the intensity level of the sum of the reflected light to an optimum intensity level, thereby enabling constant formation of an optimum mark region.

In the above conventional optical disk recording/reproducing method, the sum of the reflected light of the laser beam for recording is detected and a state of formation of the mark region due to recording is sensed. Whereas, in correlation between the intensity of the laser beam for recording and the sum of the intensity of the reflected light, when the intensity of the laser beam is lower than an intensity necessary for a normal mark formation, variation level in the sum of the intensity of the reflected light is sufficiently large, which indicates a state of formation of the mark region to some extent. However, when the intensity of the laser beam further increases over the intensity necessary for the normal mark formation, the variation level in the sum of the intensity of the reflected light tends to gradually decrease to saturate.

Therefore, even if the intensity of the laser beam actually deviates in the vicinity of the optimum intensity and the formed mark region is off an optimum size, the deviation in the sum of the intensity of the reflected light cannot be sensed accurately and precisely.

However, when irradiating the laser beam for recording onto the optical disk, heat disperses within a recording layer. While, it takes time to form a mark. Therefore, a position on which the laser beam for recording irradiates is a rear end of the mark region which has been formed by the moment. Namely, the mark is formed at an anterior position from the position irradiated actually with the laser beam. Thus, the reflected light of the laser beam for recording becomes a reflected light from the rear end position of the formed mark region while the mark is being formed. At this time, in the case of the optical disk using an organic dye based recording film such as CD-R and DVD-R, the reflected light from the mark region and the reflected light from the space region are different in phase. Thus, in a length direction of the mark region, namely in a tangential direction of a recording track of the optical disk, distribution in intensity of the reflected light from the rear end position of the mark region on the surface of a far field shows deviation with reference to the rear end position of the mark region.

Therefore, this deviation of the distribution of the intensity is called tangential push-pull (hereinafter referred to as TPP). This TPP depends on a phase variation corresponding to a state of formation of the mark region due to recording. On the other words, as the intensity of the laser beam for recording is raised, the phase variation at the rear end position of the mark region increases, and as the intensity of the laser beam is reduced, the phase variation at the rear end position of the mark region decreases. The intensity of the laser beam and the phase variation at the rear end position of the mark region have nearly proportionality relation. Therefore, TPP signal level from the rear end position of the mark region is detected, thereby the state of the formation of the mark region due to the recording can be accurately sensed.

A system of detecting the TPP signal from the rear end position of the mark region, thereby sensing the state of the formation of the mark region due to the recording, followed by determining whether good or bad in a recording state, namely a verification system during the recording is already known and disclosed, for instance, in Japanese Laid-Open Patent Publication No.S59-207436.

Japanese Laid-Open Patent Publication No.H7-29179 discloses a method for controlling recording power with the TPP signal (error signal) during recording power irradiation. However, these prior arts show that whether the recording state is good or bad is possible to detect to some extent with a TPP signal monitor, however they do not show a specific constitution and method how to use the TPP signal during the recording in order to correct appropriately or optimally the recording power or the recording state.

For instance, Japanese Laid-Open Patent Publication No.H7-29179 describes to load the TPP signal normalized through the sum of an amount of the reflected light into a microcomputer and to correct the recording power, however does not describe specifically what TPP signal is used and how it is used for correcting the recording power.

Therefore, these prior arts only describe possibility to determine whether the recording is good or bad with the TPP signal and to perform correction of rough recording condition (power). It is difficult to specifically achieve a precise correction and control of the recording condition of the optical disk performed high density recording.

Namely, there has not been a specific proposal yet about measures to accurately detect with high precision difference between a state of formation of the mark region during the recording and a state of formation in an optimum recording condition and to constantly form an optimum mark region while correcting the recording condition for the intensity of the laser beam and so on for reducing the difference as much as possible.

DISCLOSURE OF THE INVENTION

An object of the present invention is to provide an optical disk recording/reproducing method allowing the above problems to be overcome.

A further object of the present invention is to provide an optical disk recording/reproducing method allowing an optimum mark region to be constantly formed while correcting appropriately recording conditions.

A further object of he present invention is to provide an optical disk recording/reproducing method allowing an optimum mark region to be constantly formed while appropriately correcting the recording conditions.

First embodiment of the present invention is to provide an optical disk recording/reproducing method correcting a laser beam and irradiating the same onto an optical disk surface, and followed by performing recording and reproduction of information on the optical disk, wherein the method comprises the steps of:

detecting difference of intensity in a far field of reflected light of the laser beam from different positions spaced in a tangential direction of recording track of the optical disk;

adjusting recording conditions so that a level of difference of the light intensity comes close to an optimum level obtained when being recorded in an optimum recording condition, where the light intensity is detected after a preset time passes from the time of start of irradiation of the laser beam; and performing recording of the information onto the optical disk based on the adjusted recording conditions.

Preferably, the optimum level obtained when being recorded in the optimum recording condition is previously calculated through a method comprising the steps of:

performing a test recording by changing at least any one of a test recording power and a test recording condition in a test area of the optical disk;

holding the level of the difference of the intensity of the reflected light detected after the given time passes from the time of the start of the irradiation of the laser beam corresponding to the test recording condition in the test record;

adopting the optimum recording condition from the recorded signal which optimizes signal quality in reproduction; and selecting the level of the difference in the intensity of the reflected light corresponding to the adopted optimum recording condition adopted as the optimum level.

The level of the difference in the intensity is preferably a level after the given time set in the shortest mark length or less which is recorded onto the optical disk passes from the time of the start of the irradiation of the laser beam.

The step of adjusting the recording conditions is preferably performed so as to equalize the level of the difference in the light intensity with the optimum level.

The optical disk in which phase of the reflected light from a region performed recording is different from the phase of the reflected light from an unrecorded region is preferable.

The step of adjusting the recording condition preferably further includes the steps of:

comparing a magnitude relation of the levels between a state monitoring signal indicating the level of the difference in the light intensity and a reference level signal indicating the optimum level;

performing an output adjustment of the laser beam by putting a recording surplus signal into a non-active state and simultaneously putting a recording shortage signal into an active state and then increasing output of the laser beam when the level of the state monitoring signal is lower than the level of the reference level signal, and while by putting the recording surplus signal into the active state and simultaneously putting the recording shortage signal into the non-active state and then reducing the output of the laser beam when the level of the state monitoring signal is higher than the level of the reference level signal; and repeating the comparing step and the output adjusting step until the difference between the level of the state monitoring signal and the level of the reference level signal comes to within a range of an allowable error determined previously and until both the record surplus signal and the record shortage signal are put into the non-active state.

Further preferably, the comparing step and the output adjusting step are repeated until the level of the state monitoring signal and the level of the reference level signal equalize with each other and both the recording surplus signal and the recording shortage signal are put into the non-active state.

Second embodiment in the present invention provides an recording/reproducing method performing recording and reproduction of information into a storage medium in which phase of reflected light from a region performed recording and phase of reflected light from an unrecorded region are different, wherein the method comprises the steps of:

detecting difference in intensity in a far field of the reflected light of the laser beam from different positions spaced in a tangential direction of a recording track of the storage medium; and adjusting a recording condition so that a level of the difference in the light intensity comes close to an optimum level obtained when being recorded in an optimum recording condition, where the light intensity is detected after a preset time passes from the time of start of irradiation of the laser beam.

Preferably, the optimum level obtained when being recorded in the optimum recording condition is previously calculated through a method comprising the steps of:

performing a test recording by changing at least any one of a test recording power and a test recording condition in a test area of the storage medium;

holding the level of the difference in the intensity of the reflected light detected after the given time passes from the time of the start of the irradiation of the laser beam corresponding to the test recording condition in the test record;

adopting the optimum recording condition from the recorded signal which optimizes signal quality in reproduction; and selecting the level of the difference in the intensity of the reflected light corresponding to the adopted optimum recording condition as the optimum level.

The level of the difference in the intensity is preferably a level after the given time set in the shortest mark length or less which is recorded in the storage medium passes from the time of the start of the irradiation of the laser beam.

The step of adjusting the recording condition is preferably performed so as to equalize the level of the difference in the light intensity with the optimum level.

The storage medium in which phase of the reflected light from the region performed recording is different from the phase of the reflected light from the unrecorded region is preferable.

The step of adjusting the recording condition preferably further includes the steps of:

comparing a magnitude relation of the levels between a state monitoring signal indicating the level of the difference of the light intensity and a reference level signal indicating the optimum level;

performing an output adjustment of the laser beam by putting a recording surplus signal into a non-active state and simultaneously putting a recording shortage signal into an active state and then increasing output of the laser beam when the level of the state monitoring signal is lower than the level of the reference level signal, and while by putting the recording surplus signal into the active state and simultaneously putting the recording shortage signal into the non-active state and then reducing the output of the laser beam when the level of the state monitoring signal is higher than the level of the reference level signal; and repeating the comparing step and the output adjusting step until the difference between the level of the state monitoring signal and the level of the reference level signal comes to within a range of an allowable error determined previously and both the record surplus signal and the record shortage signal are put into the non-active state.

Further preferably, the comparing step and the output adjusting step are repeated until the level of the state monitoring signal and the level of the reference level signal equalize with each other and both the record surplus signal and the record shortage signal are put into the non-active state.

The storage medium typically comprises an optical disk.

Third embodiment in the present invention provides an optical disk recording/reproducing apparatus collecting a laser beam and irradiating the same onto an optical disk and performing recording and reproduction of information for the optical disk, wherein the apparatus includes the means of:

detecting difference in intensity in a far field of the reflected light of the laser beam from different positions spaced in a tangential direction of a recording track of the optical disk;

generating and holding an optimum level of the difference in the intensity in the far field of the reflected light of the laser beam, wherein the optimum level is obtained when being recorded in an optimum recording condition;

adjusting a recording condition so that a level of difference in the light intensity comes close to the optimum level, where the light intensity is detected by the detecting means after a preset time passes from the time of start of irradiation of the laser beam; and performing recording of the information onto the optical disk based on the adjusted recording condition.

The means of generating and holding the optimum level preferably includes the means of:

performing a test recording by changing at least any one of a test recording power and a test recording condition in a test area of the optical disk;

holding the level of the difference in the intensity of the reflected light detected after the given time passes from the time of start of irradiation of the laser beam corresponding to the test recording condition in the test record;

adopting the optimum recording condition from the recorded signal which optimizes signal quality in reproduction; and selecting the level of the difference in the intensity of the reflected light corresponding to the adopted optimum recording condition as the optimum level.

A means of generating a timing after the given time set in the shortest mark length or less which is recorded in the optical disk passes from the time of the start of the irradiation of the laser light is further included and the detecting means preferably performs detection with the timing.

The step of adjusting the recording condition preferably performs so as to equalize the level of the difference in the light intensity with the optimum level.

The optical disk in which phase of the reflected light from the region performed recording is different from the phase of the reflected light from the unrecorded region is preferable.

The step of adjusting the recording condition includes the steps of:

comparing a magnitude relation in the levels between a state monitoring signal indicating the level of the difference in the light intensity and a reference level signal indicating the optimum level; and performing an output adjustment of the laser beam by putting a recording surplus signal into a non-active state and simultaneously putting a recording shortage signal into an active state and increasing output of the laser beam when the level of the state monitoring signal is lower than the level of the reference level signal, and while by putting the recording surplus signal into the active state and simultaneously putting the recording shortage signal into the non-active state and then reducing the output of the laser beam when the level of the state monitoring signal is higher than the level of the reference level signal:

wherein the comparing step and the output adjusting step preferably repeat the comparing operation and the output adjusting operation respectively until the difference between the level of the state monitoring signal and the level of the reference level signal comes to within a range of an allowable error determined previously and until both the record surplus signal and the record shortage signal are put into the non-active state.

Further preferably, the comparing step and the output adjusting step repeat the comparing operation and the output adjusting operation respectively until the level of the state monitoring signal and the level of the reference level signal equalize with each other and until both the record surplus signal and the record shortage signal are put into the non-active state.

Fourth embodiment in the present invention provides an information recording/reproducing apparatus performing recording and reproduction of information into the storage medium in which a phase of reflected light from a region performed recording and the phase of reflected light from an unrecorded region are different, wherein the apparatus includes the means of:

detecting difference in intensity in a far field of the reflected light of the laser beam from different positions spaced in a tangential direction of a recording track of the storage medium;

generating and holding an optimum level of the difference in the far field of the reflected light of the laser beam which is obtained when being recorded in an optimum recording condition;

adjusting a recording condition so that a level of difference in the light intensity comes close to the optimum level, where the light intensity is detected by the detecting means after a preset time passes from the time of start of irradiation of the laser beam; and performing recording of the information into the storage medium based on the adjusted recording condition.

The means of generating and holding the optimum level preferably includes the means of:

performing a test recording by changing at least any one of a test recording power and a test recording condition in a test area of the storage medium;

holding the level of the difference in the intensity of the reflected light detected after the given time passes from the time of the start of the irradiation of the laser beam corresponding to the test recording condition in the test record;

adopting the optimum recording condition from the recorded signal which optimizes signal quality in reproduction; and selecting the level of the difference in the intensity of the reflected light corresponding to the adopted optimum recording condition as the optimum level.

A means of generating a timing after the given time set in the shortest mark length or less which is recorded in the storage medium passes from the time of the start of the irradiation of the laser light is further included and the detecting means preferably performs detection with the timing.

The step of adjusting the recording condition preferably performs so as to equalize the level of the difference in the light intensity to the optimum level.

The optical disk in which a phase of the reflected light from the region performed recording is different from the phase of the reflected light from an unrecorded region is preferable.

The step of adjusting the recording condition including the means of:

comparing a magnitude relation in the levels between a state monitoring signal indicating the level of the difference in the light intensity and a reference level signal indicating the optimum level; and performing an output adjustment of the laser beam by putting a recording surplus signal into a non-active state and simultaneously putting a recording shortage signal into an active state and increasing output of the laser beam when the level of the state monitoring signal is lower than the level of the reference level signal, and while by putting the recording surplus signal into the active state and simultaneously putting the recording shortage signal into the non-active state and then reducing the output of the laser beam when the level of the state monitoring signal is higher than the level of the reference level signal:

wherein the comparing step and the output adjusting step preferably repeat the comparing operation and the output adjusting operation respectively until the difference between the level of the state monitoring signal and the level of the reference level signal comes to within a range of an allowable error determined previously and until both the record surplus signal and the record shortage signal are put into the non-active state.

Further preferably, the comparing step and the output adjusting step repeat the comparing operation and the output adjusting operation respectively until the level of the state monitoring signal and the level of the reference level signal equalize with each other and until both the record surplus signal and the record shortage signal are put into the non-active state.

As described above, the optical disk recording/reproducing method in the present invention is an optical disk recording/reproducing method collecting a laser beam and irradiating the same onto an optical disk surface thereby performing recording and reproduction of information on the optical disk, wherein the method performs the recording onto the optical disk while detecting difference of the previous and subsequent light intensities in a tangential direction of the recording track of the optical disk in the far field of the reflected light of the laser beam for the recording which is irradiated onto the optical disk when performing the recording of the information to be recorded on the optical disk and adjusting the recording condition so as to conform the level of the difference in the light intensity detected after a given time determined previously passes from the time of the start of the irradiation of the laser beam for the recording to the level obtained when being recorded in the optimum recording condition.

As further described above, the optical disk recording/reproducing apparatus in the present invention is an optical disk recording/reproducing apparatus collecting a laser beam and irradiating the same onto an optical disk surface thereby performing recording and reproduction of information on the optical disk, wherein the apparatus is provided with a detecting means of detecting difference in the previous and subsequent light intensities in a tangential direction of the recording track of the optical disk in the far field of the reflected light of the laser beam for the recording which is irradiated onto the optical disk when performing the recording of the information to be recorded on the optical disk, a calculating means of calculating difference between the level of the light intensity detected through the detecting means after a given time determined previously passes from the time of the start of the irradiation of the laser beam for the recording and the level obtained when being recorded in the optimum recording condition, and a means of adjusting the recording condition so as to reduce the difference calculated through the calculating means.

Namely, the optical disk recording/reproducing method in the present invention is an optical disk recording/reproducing method collecting the laser beam and irradiating the same onto the optical disk and performing the recording of information onto the optical disk and the reproduction of the recorded information, wherein the method uses as the optical disk a medium having characteristics that the phase of the reflected light from the region performed recording is different from the phase of the reflected light from the unrecorded region, and detects the difference of the previous and subsequent light intensities in a tangential direction of the recording track of the optical disk in the far field of the reflected light of the laser beam for the recording which is irradiated onto the optical disk when performing the recording of the information to be recorded on the optical disk, and then performs the recording while adjusting the recording condition so as to conform the level of the difference in the light intensity after a given time passes from the time of the start of the irradiation of the laser beam for the recording to the level obtained when being recorded in the optimum recording condition.

The optical disk recording/reproducing apparatus in the present invention is also an optical disk recording/reproducing apparatus collecting the laser beam and irradiating the same onto the optical disk and performing the recording of information onto the optical disk and the reproduction of the recorded information, wherein the apparatus is constituted by including the means of: detecting the difference of the previous and subsequent light intensities in a travelling direction of the optical disk in the far field of the reflected light of the laser beam for recording which is irradiated onto the optical disk when performing the recording of the information to be recorded on the optical disk by using as the optical disk a medium having characteristics that the phase of the reflected light from the region performed the recording is different from the phase of the reflected light from the unrecorded region; and detecting the difference between the level of the difference in the light intensity after a given time passes from the time of the start of the irradiation of the laser beam for the recording and the level obtained when being recorded in the optimum recording condition so as to reduce the difference.

The optical disk recording/reproducing apparatus in the present invention also includes a means of performing a test recording by changing a recording power and the recording condition in the test area, then holding the level of the difference in the light intensity after the given time passes from the start of the irradiation in addition to the recording condition and a recording position used in the previous test record, and adopting the optimum recording condition from the recorded signal which optimizes the signal quality in reproduction, followed by selecting the level of the difference of the light intensity corresponding to the optimum recording condition as the level of the difference in the light intensity in the optimum recording condition.

The optical disk recording/reproducing apparatus in the present invention, when defining the shortest mark length recorded onto the optical disk as nT (where n is an integer number and T is a channel clock), further regards the level of the difference in the light intensity as the level after the given time set in the nT of less passes from the time of the start of the irradiation of the laser beam for the recording.

Thus, the present invention uses the optical disk varied in phase of the reflected light in the mark region and the space region, and accurately detects with high precision difference between a state of formation of the mark region due to the recording and a state of formation in the optimum recording condition, and enables an optimum mark region to be constantly formed while correcting appropriately the recording condition.

BEST MODES FOR CARRYING OUT THE INVENTION

Figure 1:
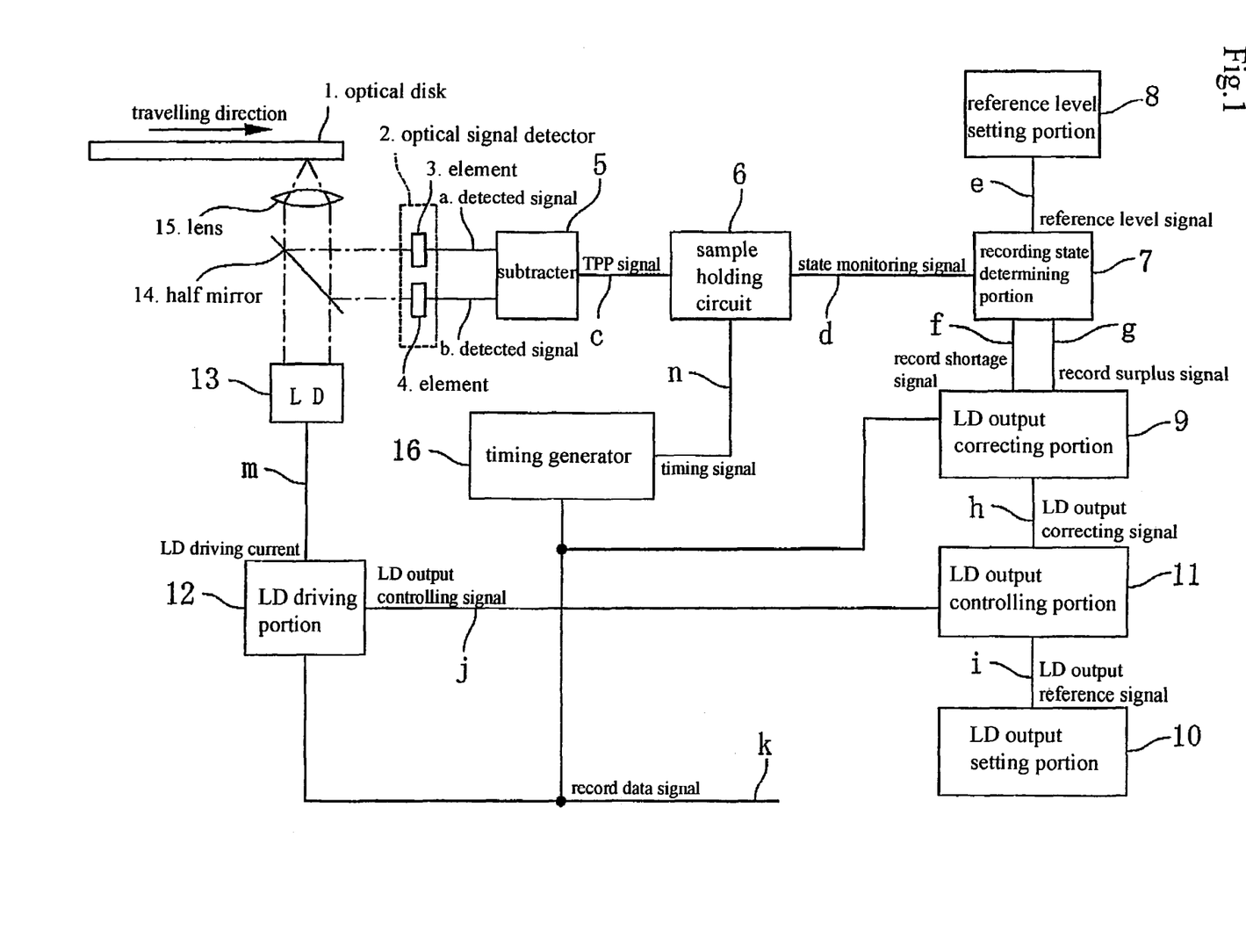
FIG. 1 is a block diagram showing a constitution of an optical disk recording/reproducing apparatus according to first embodiment of the present invention.

Embodiments of the present invention will be then described in reference to drawings. FIG. 1 is a block diagram showing a constitution of an optical disk recording/reproducing apparatus according to a first embodiment of the present invention. In FIG. 1, the optical disk recording/reproducing apparatus according to the first embodiment of the present invention is constituted of an optical disk 1, a optical signal detector 2 comprising a pair of first and second elements 3 and 4, a subtracter 5, a sample hold circuit 6, a recording state determining portion 7, a reference level setting portion 8, an LD (Laser Diode) output correcting portion 9, an LD output setting portion 10, and LD output controlling portion 11, and LD driving portion 12, an LD 13, a half mirror 14, and a lens 15 as well as a monitoring timing generator 16.

The LD driving portion 12 receives an input of a record data signal k supplied from outside and an input of an LD output controlling signal j supplied from the LD output controlling portion 11. When the record data k is high level, the LD driving portion 12 outputs LD driving current m of a high value of electric current necessary for emitting a high-intensity laser beam for forming a mark region (recording region) based on an LD output controlling signal j, and supplies the LD driving current m into the LD 13. While, when the record data signal k is low level, the LD driving portion 12 outputs the LD driving current m of a low value of electric current necessary for emitting a laser beam with low intensity at which information can be reproduced.

The LD 13 emits the laser beam of an intensity corresponding to a size (value of electrical current) of the LD driving current m supplied from the LD driving portion 12. The laser beam is irradiated onto a surface of the optical disk 1 through the half mirror 14 and the lens 15. When the record data signal k is high level, the laser beam irradiated onto the optical disk 1 becomes high intensity to form the mark region on the optical disk 1. Also when the record data signal k is low level, the intensity of the laser beam irradiated onto the optical disk 1 is low to form the space region (unrecorded region) on the optical disk 1.

A reflected light from the optical disk 1 enters into the optical signal detector 2 through the lens 15 and the half mirror 14. The optical signal detector 2 is constituted of a pair of first and second elements 3 and 4 arranged with being spaced in a vertical direction and receives the reflected light from the optical disk 1 at positions spaced vertically. . The vertical direction of the reflected light at the position of the optical signal detector 2 corresponds to a traveling direction of the optical disk 1 to a surface of the optical disk 1. Therefore, the optical signal detector 2 receives light by separating the reflected light into back and forth of the traveling direction of the optical disk 1.

The first and second elements 3 and 4 receive a part of the reflected light respectively, then output first and second detected signals a and b having voltages in proportion to an amount of light received by respective elements, and supplies the first and second detected signal a and b into the subtracter 5. The subtracter 5 performs an operational amplifying of difference between the first and second detected signals a and b to generate a TPP (tangential push-pull) signal c, and then outputs the TPP signal c to the sample hold circuit 6, where the TPP signal c has a positive polarity at a rear end position of the mark region formed through the record.

The monitoring timing generator 16 detects a rising edge at which the record data signal k varies from a low level to a high level, and generates a pulse signal of a given time interval. This given time interval may be, for instance, the same level as a unit time width T of the record data signal i. And the monitoring timing generator 16 delays the pulse signal by a given time, for instance, a time about two and a half times of the unit time width T, then outputs the delayed pulse signal as a timing signal n, and supplies the timing signal n into the sample hold circuit 6. The sample hold circuit 6 detects the level of the TPP signal c at the rising edge of the timing signal n to hold the same, then outputs the detected level as a state monitoring signal d, and supplies the state monitoring signal d into the recording state determining portion 7.

The reference level setting portion 8 holds a level of the state monitoring signal d at a optimum recording state previously calculated in a manner described below, then outputs the level as a reference level signal e, and supplies the reference level signal e into the recording state determining portion 7.

The recording state determining portion 7 compares the reference level signal e to the state monitoring signal d, then outputs a record shortage signal f and a record surplus signal g based on a result of comparison thereof, and supplies the record shortage signal f and the record surplus signal g into the LD output correcting portion 9.

When the reference level signal e and the state monitoring signal d are consistent with each other, both the record shortage signal f and the record surplus signal g are low level. When the state monitoring signal d is low compared to the reference level signal e, the record shortage signal f is high level and the record surplus signal g is low level. When the state monitoring signal d is high compared to the reference level signal e, the record surplus signal g is high level and the record shortage signal f is low level.

The LD output correcting portion 9 controls a level of an LD output correcting signal h based on the record shortage signal f and the record surplus signal g as well as the record data signal k, and supplies the LD output correcting signal h into the LD output controlling portion 11. When the record data signal k is low level and the record shortage signal f is high level, the LD output correcting portion 9 increases the level of the LD output correcting signal h. Also, when the record data signal k is low level and the record surplus signal g is high level, the LD output correcting portion 9 decreases the level of the LD output correcting signal h. Further, in the other state, the LD output correcting portion 9 maintains the level of the LD output correcting signal h.

The LD output setting portion 10 holds an LD output set value for obtaining an optimum light intensity of the laser beam for recording which has been previously calculated in a manner described below, then outputs an LD output reference signal i corresponding to the LD output set value, and supplies the LD output reference signal i into the LD output controlling portion 11.

The LD output controlling portion 11 performs an add operation of the LD output reference signal i and the LD output correcting signal h, then generates the LD output controlling signal j having a voltage level equivalent to this operated value, and supplies the LD output controlling signal j into the LD driving portion 12.

Figure 2:
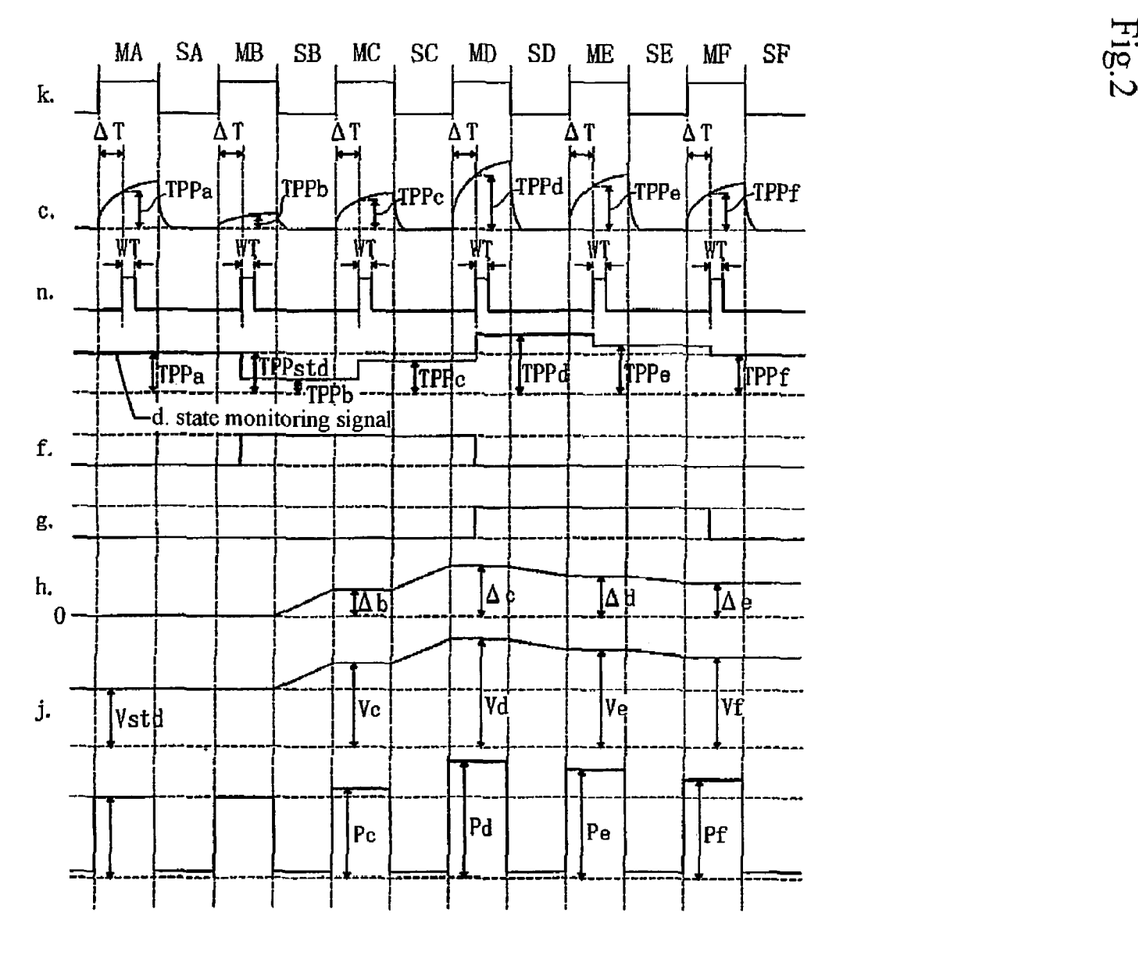
FIG. 2 is a timing chart showing operations of the optical disk recording/reproducing apparatus according to the first embodiment of the present invention.
Figure 3:
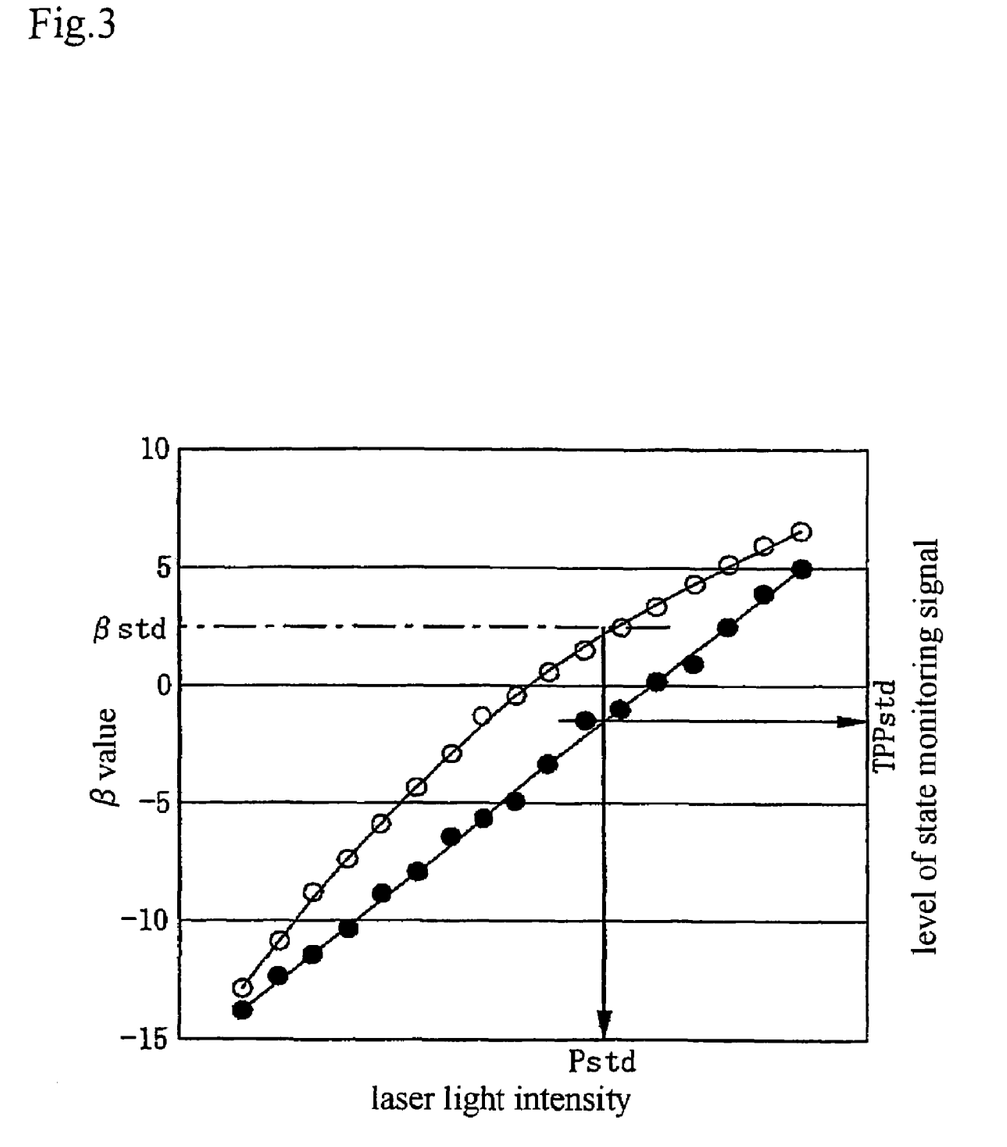
FIG. 3 is a view showing correlation between intensity of a laser beam calculated through a test record and β value and a state monitoring signal according to the first embodiment of the present invention.

FIG. 2 is a timing chart showing operations of the optical disk recording/reproducing apparatus according to the first embodiment of the present invention and FIG. 3 is a view showing correlation between an intensity of laser beam calculated through a test record and β value and a state monitoring signal according to the first embodiment of the present invention. Operations of the optical disk recording/reproducing apparatus according to the first embodiment of the present invention will be described in reference to FIG. 1 to 3.

Before performing recording of information onto an optical disk 1, an optimum light intensity of a laser beam for recording and a reference level for the light intensity in the present embodiment are calculated. Therefore, in PCA (test recording area) of an inner peripheral portion of the optical disk 1, while varying the laser light intensity, the test recording of the information is performed and a measurement of a level of a state monitoring signal is also carried out, thereby to obtain correlation between the laser light intensity and the level of the state monitoring signal detected through a record of the laser light intensity.

This information performed the test recording is reproduced and β value is measured in the same method as a conventionally performed method to obtain the correlation between the laser light intensity and the β value equivalent to the laser light intensity. As shown in FIG. 3, the correlation between the laser light intensity and the state monitoring signal level and the β value is a relation between the laser light intensity and the β value (shown by ○ in FIG. 3) and a relation between the laser light intensity and the state monitoring signal (shown by ● in FIG. 3). In FIG. 3, a desired β value which optimizes signal quality in reproduction is expressed by β std. Based on the correlation shown in FIG. 3, Pstd is adopted as the desired laser light intensity obtained at the β value and TPPstd is selected as the level of the state monitoring signal showing a recording state corresponding to the desired laser light intensity Pstd.

The LD output setting portion 10 outputs an LD output reference signal i of a level of Vstd corresponding to an LD output setting value obtaining an optimum laser light intensity Pstd calculated as described above. A reference level setting portion 8 outputs a reference level signal e of the state monitoring signal level TPPstd at the optimum laser light intensity Pstd.

In this case, the recording of the information is performed based on the record data signal k shown in FIG. 2 and further when recording of a zone MA, formation of a mark region is performed in the same recording state as PCA in which the test recording is carried out, and when recording of subsequent zones MB, MC, MD, ME, and MF, the formation of the mark region is insufficient due to deterioration in sensitivity of a recording film, defocus and so on. Such case will be considered.

First, in the zone MA, the LD driving portion 12 drives an LD 13 at an LD driving current m having electrical current of an intensity corresponding to the level Vstd of an LD output controlling signal j shown in FIG. 2 and the laser beam of the optimum laser light intensity Pstd shown in FIG. 2 is irradiated onto the optical disk 1, thereby to perform the formation of the mark region.

Then, difference between first and second detected signals a and b outputted from a optical signal detector 2 which has received reflected light from the optical disk 1 is performed an operational amplifying with a subtracter 5, thereby to obtain TPP signal c shown in FIG. 2.

A timing generator 16 also delays by $\Delta T$ from a rising edge of the record data signal k of the zone MA and then outputs a timing signal n having a width WT.

A sample hold circuit 6 detects a level TPPa of the TPP signal c at the rising edge of the timing signal n to hold the same, and then: outputs the state monitoring signal d having the level TPPa.

In the zone MA, the formation of the mark region is performed in the same recording state as PCA in which the test recording has been carried out, thereby the level TPPa of the state monitoring signal d and the level TPPstd of the reference level signal e equalize with each other. Namely, a relation of TPPa=TPPstd is true. Therefore, both the record shortage signal f and the record surplus signal g outputted from the recording state determining portion 7 become low level.

As a result, an LD output correcting signal h outputted from an LD output correcting portion 9 maintains 0 level in a zone SA and further the level of the LD output controlling signal j outputted from an LD output controlling portion 11 maintains Vstd.

Then, in the zone MB, the laser beam having a laser light intensity Pstd of the same level as the laser light intensity in the zone MA is irradiated onto the optical disk 1, thereby to form a mark region. At this time, a TPP signal c shown in FIG. 2 is obtained in the zone MB and further the level of the state monitoring signal d becomes TPPb.

In the zone MB, the intensity of the laser beam is Pstd, therefore formation of the mark region is lacking, whereby the level TPPb of the state monitoring signal d is lower than the level TPPstd of the reference level signal e. Namely, as shown in FIG. 2, a relation of TPPb<TPPstd is true. Therefore, the record shortage signal f outputted from the recording state determining portion 7 becomes high level.

As shown in FIG. 2, in a zone SB, the LD output correcting portion 9 increases the LD output correcting signal h up to a level $\Delta b$. As a result, the level of the LD output controlling signal j outputted from the LD output correcting portion 11 becomes a level Vc added with the level Vstd of the LD output reference signal i and the level $\Delta b$ of the LD output correcting signal h.

In a subsequent zone MC, the formation of the mark region is performed at a laser light intensity Pc (>Pstd) corresponding to the LD output controlling signal Vc. Then, a level TPPc of the state monitoring signal d in the zone MC is lower than the level TPPstd of the reference level signal e. Namely, as shown in FIG. 2, a relation of TPPc<TPPstd is true. This means that correction of the laser light intensity is not enough and that the formation of the mark region has been lacking yet. Therefore, as shown in FIG. 2, the record shortage signal f outputted from the recording state determining portion 7 maintains high level.

As shown in FIG. 2, in a zone SC, the LD output correcting portion 9 increases the LD output correcting signal h up to a level $\Delta c$ which is further high level compared to the zone MC. As a result, a level of the LD output controlling signal j outputted from the LD output controlling portion 11 becomes a level Vd added with the level Vstd of the LD output reference signal i and the level $\Delta c$ of the LD output correcting signal h.

In a subsequent zone MD, the formation of the mark region is performed at a laser light intensity Pd corresponding to the LD output controlling signal Vd. Then, a level TPPd of the state monitoring signal d in the zone MD is higher than the level TPPstd of the reference level signal e. Namely, as shown in FIG. 2, a relation of TPPd>TPPstd is true. This means that the correction of the laser light intensity is excess and that the formation of the mark region becomes excessive.

As shown in FIG. 2, a record surplus signal g outputted from the recording state determining portion 7 becomes high level. Then, the LD output correcting portion 9 decreases the LD output correcting signal h down to a low level $\Delta d$ compared to the level in the zone MD in the zone SD. As a result, the level of the LD output controlling signal j outputted from the LD output controlling portion 11 becomes a level Ve added with the level Vstd of the LD output reference signal i and the level $\Delta d$ of the LD output correcting signal h.

As shown in FIG. 2, in a subsequent zone ME, the formation of the mark region is performed at a laser light intensity Pe corresponding to the LD output controlling signal Ve. Then, a level TPPe of the state monitoring signal d in the zone ME is higher than the level TPPstd of the reference level signal e. Namely, as shown in FIG. 2, a relation of TPPe>TPPstd is true. This means that the correction of the laser light intensity is excess and that the formation of the mark region is excessive.

Therefore, as shown in FIG. 2, the record surplus signal g outputted from the recording state determining portion 7 maintains high level. Then, the LD output correcting portion 9 decreases the LD output correcting signal h down to a low level $\Delta e$ compared to the zone ME in a zone SE. As a result, the level of the LD output controlling signal j outputted from the LD output controlling portion 11 becomes a level Vf added with the level Vstd of the LD output reference signal i and the level $\Delta e$ of the LD output correcting signal h.

As shown in FIG. 2, in a subsequent zone MF, the formation of the mark region is performed at a laser light intensity Pf corresponding to the LD output controlling signal Vf. Then, a level TPPf of the state monitoring signal d in the zone MF and the level TPPstd of the reference level signal e equalize with each other. Namely, as shown in FIG. 2, a relation of TPPf=TPPstd is true. This means that the correction of the laser light intensity becomes appropriate, and that the state of the formation of the mark region becomes optimum.

Therefore, as shown in FIG. 2, both the record shortage signal f and the record surplus signal g outputted from the recording state determining portion 7 become low level. Then, the LD output correcting portion 9 holds the LD output correcting signal h to be the same level $\Delta e$ as the level in the zone MF. As a result, the level of the LD output controlling signal j outputted from the LD output controlling portion 11 maintains to be Vf shown in FIG. 2 and the recording in following mark forming zone is performed at the laser light intensity Pf corrected appropriately against variation in sensitivity and so on of a recording film.

In a subsequent recording, in the case that a state of the formation of the mark region deviates again from the optimum state due to the variation in the sensitivity and so on of the recording film, difference in level between the state monitoring signal obtained during the recording and the reference level signal arises, therefore in order to eliminate the difference in the level, the laser light intensity is corrected appropriately and the optimum recording state is maintained as described above.

Thereby, when recording information, using the difference in the level between a recording state monitoring detected signal detected from the TPP signal based on reflected light during the recording and a recording state monitoring reference level signal having the level of the recording state monitoring signal in the optimum recording state, shortage and excess of the formation of the mark region is accurately detected with high precision and recording conditions such as the intensity and so on of the laser beam for the recording is appropriately adjusted, thereby allowing the optimum mark region to be constantly formed.

Thus, the present embodiment uses an optical disk varying in phase of the reflected light in the mark region and the space region, and detects the TPP signal from a rear end position of the mark region formed by the recording, and then senses accurately with high precision difference between the state of the formation of the mark region by the recording and the state of the formation in the optimum recording conditions from the difference of the level between the detected TPP signal and the reference level signal having the level of the TPP signal in the optimum recording state, thereby to allow the optimum mark region to be constantly formed while correcting appropriately the recording conditions.

INDUSTRIAL APPLICABILITY

As described above, the present invention uses a medium having characteristics that phase of reflected light from a region performed recording is different from the phase of the reflected light from an unrecorded region, as an optical disk, and detects difference in previous and subsequent light intensity in a tangential direction of the recording track of the optical disks in a far field of the reflected light of a laser beam for the recording which is irradiated onto the optical disk when performing the recording of information to be recorded onto the optical disk, and while adjusting recording conditions so as to conform a level of difference in the light intensity detected after a given time previously set passes from start of irradiation during the irradiation of the laser beam for the recording to the level obtained when being recorded in the optimum recording conditions, performing the recording onto the optical disk, thereby to allow the optimum mark region to be constantly formed while correcting appropriately the recording conditions.

What is claimed is:

1. An optical disk recording/reproducing method performing recording and reproduction of information onto an optical disk by collecting a laser beam and irradiating the same on a surface of the optical disk, wherein the method includes the steps of:

detecting difference in intensity of reflected light of the laser beam in a far field from different positions spaced in a tangential direction of a recording track of the optical disk;

adjusting recording conditions so that a level of the difference in the light intensity detected after preset time passes from a time of start of irradiation of the laser beam comes close to an optimum level obtained when being recorded in an optimum recording conditions; and performing the recording of the information onto the optical disk based on the adjusted recording conditions, wherein the step of adjusting the recording conditions further includes the steps of:

comparing a magnitude relation of the level between a state monitoring signal indicating the level of the difference in the light intensity and a reference level signal indicating the optimum level;

performing an output adjustment of the laser beam by putting a record surplus signal into a non-active state and simultaneously putting a record shortage state into an active state, and then increasing an output of the laser beam, when a level of a state monitoring signal is lower than a reference level signal, and by putting the record surplus signal into the active state and simultaneously putting the record shortage signal into the non-active state and then reducing the output of the laser beam, when the level of the state monitoring signal is higher than the level of the reference level signal; and repeating the comparing step and the output adjusting step until the difference between the level of the state monitoring signal and the level of the reference level signal comes to within a range of an allowable error previously determined and until both the record surplus signal and the record shortage signal are put into the non-active state.

2. An optical disk recording/reproducing method as claimed in claim 1, wherein the optimum level obtained when being recorded in the optimum recording conditions is previously calculated through the method including the steps of:

performing a test recording by varying at least any one of a test recording power and a test recording conditions in a test area of the optical disk;

holding the level of the difference in the intensity of the reflected light detected after the given time passes from the start of the irradiation of the laser beam corresponding to the test recording conditions in the test recording;

adopting the optimum recording conditions from the recorded signal which optimizes signal quality in reproduction; and selecting the level of the difference of the intensity of the reflected light corresponding to the adopted optimum recording conditions as the optimum level.

3. An optical disk recording/reproduction method as claimed in claim 1, wherein the level of the difference in the intensity is a level after the given time set in the shortest mark length or less recorded onto the optical disk passes from the time of the start of the irradiation of the laser beam.

4. An optical disk recording/reproducing method as claimed in claim 1, wherein the step of adjusting the recording conditions is performed so as to equalize the level of the difference of the light intensity with the optimum level.

5. An optical disk recording/reproducing method as claimed in claim 1, wherein the optical disk is characterized in that a phase of the reflected light from a recorded region is different from the phase of the reflected light from an unrecorded region.

6. An optical disk recording/reproducing method as claimed in claim 1, repeating the comparing step and the output adjusting step until the level of the state monitoring signal and the level of the reference level signal equalize with each other and until both the record surplus signal and the record shortage signal are put into the non-active state.

7. A recording/reproducing method performing recording and reproduction of information in a storage medium in which a phase of reflected light from a recorded region is different from the phase of the reflected light from an unrecorded region, wherein the method includes:
   detecting difference in intensity of the reflected light of the laser beam in a far field from different positions spaced in a tangential direction of a recording track of the storage medium; and
   adjusting recording conditions so that a level of difference in the light intensity detected after a preset time passes from start of irradiation of the laser beam comes close to the optimum level obtained when being recorded in the optimum recording conditions, wherein the step of adjusting the recording conditions further includes the steps of:
   comparing a magnitude relation of the levels between a state monitoring signal indicating the level of the difference in the light intensity and the reference level signal indicating the optimum level;
   performing an output adjustment of the laser beam by putting a record surplus signal into a non-active state and simultaneously putting a record shortage state into an active state, and then increasing an output of the laser beam, when a level of the state monitoring signal is lower than the reference level signal, and while by putting the record surplus signal into the active state and simultaneously putting the record shortage signal into the non-active state and then reducing the output of the laser beam, when the level of the state monitoring signal is higher than the level of the reference level signal.

8. A recording/reproducing method as claimed in claim 7, wherein the optimum level obtained when being recorded in the optimum recording conditions is previously calculated through the method including the steps of:
   performing a test recording by varying at least any one of a test recording power and a test recording conditions in a test area of the storage medium;
   holding the level of the difference in the intensity of the reflected light detected after the given time passes from the time of the start of the irradiation of the laser beam corresponding to the test recording conditions in the test recording;
   adopting the optimum recording conditions from the recorded signal which optimizes signal quality in reproduction; and
   selecting the level of the difference in the intensity of the reflected light corresponding to the adopted optimum recording conditions as the optimum level.

9. A recording/reproducing method as claimed in claim 7, wherein the level of the difference in the intensity is the level after the given time set in the shortest mark length or less recorded in the storage medium passes from the start of the irradiation of the laser beam.

10. A recording/reproducing method as claimed in claim 7, wherein the step of adjusting the recording conditions is performed so as to equalize the level of the difference in the light intensity with the optimum level.

11. A recording/reproducing method as claimed in claim 7, repeating the comparing step and the output adjusting step until the level of the state monitoring signal and the level of the reference level signal equalize with each other and until both the record surplus signal and the record shortage signal are put into the non-active state.

12. A recording/reproducing method as claimed in claim 7, wherein the storage medium comprises an optical disk.

13. An optical disk recording/reproducing apparatus performing recording and reproduction of information onto an optical disk by collecting a laser beam and irradiating the same on a surface of the optical disk, wherein the device includes:
   means of detecting difference in intensity of reflected light of the laser beam in a far field from different positions spaced in a tangential direction of a recording track of the optical disk;
   means of generating and holding the optimum level of the difference in the intensity in the far field of the reflected light of the laser beam obtained when being recorded in the optimum recording conditions;
   means of adjusting recording conditions so that a level of the difference in the light intensity detected through the detecting means after preset time passes from a time of start of irradiation of the laser beam comes close to the optimum level; and
   means of performing the recording of the information onto the optical disk based on the adjusted recording conditions, wherein the means of generating and holding the optimum level includes:
   means of comparing a magnitude relation in the level between a state monitoring signal indicating the level of the difference in the light intensity and a reference level signal indicating the optimum level;
   means of performing an output adjustment of the laser beam by putting a record surplus signal into a non-active state and simultaneously putting a record shortage signal into an active state, and then increasing an output of the laser beam, when a level of a state monitoring signal is lower than a reference level signal, and while by putting the record surplus signal into the active state and simultaneously putting the record shortage signal into the non-active state and then reducing the output of the laser beam, when the level of the state monitoring signal is higher than the level of the reference level signal; and
   wherein the comparing means and the output adjusting means repeat the comparing operation and the output adjusting operation respectively until the difference between the level of the state monitoring signal and the level of the reference level signal is within a range of an allowable error previously determined and until both the record surplus signal and the record shortage signal are put into the non-active state.

14. An optical disk recording/reproducing apparatus as claimed in claim 13, wherein the means of generating and holding the optimum level includes:
   means of performing a test recording by varying at least any one of a test recording power and test recording conditions in a test area of the optical disk;
   means of holding the level of the difference in the intensity of the reflected light detected after the given time passes from the start of the irradiation of the laser beam corresponding to the test recording conditions in the test recording;
   means of adopting the optimum recording conditions from the recorded signal which optimizes signal quality in reproduction; and means of selecting the level of the difference in the intensity of the reflected light corresponding to the adopted optimum recording conditions as the optimum level.

15. An optical disk recording/reproducing apparatus as claimed in claim 13, further including a means generating timing after the given time set in the shortest mark length or less recorded onto the optical disk passes from the time of the start of the irradiation of the laser beam, wherein the detecting means performs detection with the timing.

16. An optical disk recording/reproducing apparatus as claimed in claim 13, wherein the means of adjusting the recording conditions performs an adjustment so as to equalize the level of the difference in the light intensity with the optimum level.

17. An optical disk recording/reproducing apparatus as claimed in claim 13, wherein the optical disk is characterized in that a phase of the reflected light from a recorded region is different from the phase of the reflected light from an unrecorded region.

18. An optical disk recording/reproducing apparatus as claimed in claim 13, wherein the comparing means and the output adjusting means repeat the comparing operation and the output adjusting operation respectively until the level of the state monitoring signal and the level of the reference level signal equalize with each other and until both the record surplus signal and the record shortage signal are put into the non-active state.

19. An information recording/reproducing apparatus performing recording and reproduction of information in a storage medium in which a phase of reflected light from a recorded region is different from the phase of the reflected light from an unrecorded region, wherein the apparatus includes:
means of detecting difference in intensity in a far field of the reflected light of the laser beam from different positions spaced in a tangential direction of a recording track of the storage medium;
means of generating and holding the optimum level of the difference in the intensity in a far field of the reflected light of the laser beam obtained when being recorded in the optimum recording conditions;
means of adjusting recording conditions so that a level of difference in the light intensity detected through the detecting means after a preset time passes from start of irradiation of the laser beam comes close to the optimum level; and
means of performing the recording of the information in the storage medium based on the adjusted recording conditions, wherein the means of adjusting the recording conditions further includes:
means of comparing a magnitude relation in the level between a state monitoring signal indicating the level of the difference in the light intensity and a reference level signal indicating the optimum level; and
means of performing an output adjustment of the laser beam by putting a record surplus signal into a non-active state and simultaneously putting a record shortage signal into an active state, and then increasing an output of the laser beam when a level of a state monitoring signal is lower than a reference level signal, and while by putting the record surplus signal into the active state and simultaneously putting the record shortage signal into the non-active state and then reducing the output of the laser beam when the level of the state monitoring signal is higher than the level of the reference level signal:
wherein the comparing means and the output adjusting means repeat the comparing operation and the output adjusting operation respectively until the difference between the level of the state monitoring signal and the level of the reference level signal comes to within a range of an allowable error previously determined and until both the record surplus signal and the record shortage signal are put into the non-active state.

20. The information recording/reproducing apparatus as claimed in claim 19, wherein the means of generating and holding the optimum level includes:
means of performing a test recording by varying at least any one of a test recording power and a test recording conditions in a test area of the storage medium;
means of holding the level of the difference in the intensity of the reflected light detected after the given time passes from the time of the start of the irradiation of the laser beam corresponding to the test recording conditions in the test recording;
means of adopting the optimum recording conditions from the recorded signal which optimizes signal quality in reproduction; and
means of selecting the level of the difference in the intensity of the reflected light corresponding to the adopted optimum recording conditions as the optimum level.

21. An information recording/reproducing apparatus as claimed in claim 19, further including means generating timing after the given time set in the shortest mark length or less recorded in the storage medium passes from the time of the start of the irradiation of the laser beam, wherein the detecting means performs detection with the timing.

22. An information recording/reproducing apparatus as claimed in claim 19, wherein the means of adjusting the recording conditions performs an adjustment so as to equalize the level of the difference in the light intensity with the optimum level.

23. An information recording/reproducing apparatus as claimed in claim 19, wherein the storage medium is an optical disk.

24. An information recording/reproducing apparatus as claimed in claim 19, wherein the comparing means and the output adjusting means repeat the comparing operation and the output adjusting operation respectively until the level of the state monitoring signal and the level of the reference level signal equalize with each other and until both the record surplus signal and the record shortage signal are put into the non-active state.

* * * * *